(12) United States Patent
Zhou

(10) Patent No.: US 8,380,001 B2
(45) Date of Patent: Feb. 19, 2013

(54) EDGE ADAPTIVE DEBLOCKING FILTER AND METHODS FOR USE THEREWITH

(75) Inventor: Hui Zhou, Toronto (CA)

(73) Assignee: ViXS Systems, Inc., Toronto, Ontario (CA)

(*) Notice: Subject to any disclaimer, the term of this patent is extended or adjusted under 35 U.S.C. 154(b) by 1029 days.

(21) Appl. No.: 12/394,519

(22) Filed: Feb. 27, 2009

(65) Prior Publication Data

US 2010/0220931 A1   Sep. 2, 2010

(51) Int. Cl.
*G06K 9/40* (2006.01)
(52) U.S. Cl. ......... 382/268; 382/266; 382/270; 382/275
(58) Field of Classification Search .................. None
See application file for complete search history.

(56) References Cited

U.S. PATENT DOCUMENTS

| | | | |
|---|---|---|---|
| 6,539,060 B1 | 3/2003 | Lee et al. | |
| 2005/0276505 A1* | 12/2005 | Raveendran | 382/268 |
| 2007/0002945 A1 | 1/2007 | Kim | |
| 2007/0237241 A1* | 10/2007 | Ha et al. | 375/240.27 |
| 2007/0291858 A1 | 12/2007 | Hussain et al. | |
| 2008/0159386 A1* | 7/2008 | Lee et al. | 375/240.03 |
| 2009/0190657 A1 | 7/2009 | Park et al. | |

OTHER PUBLICATIONS

Tobajas et al, "An Efficient Double-Filter Hardware Architecture for H.264/AVC Deblocking Filtering", Feb. 2008, IEEE Transactions on Consumer Electronics, vol. 54, No. 1, pp. 131-139.*

Peter List, et al, "Adaptive Deblocking Filter", IEEE Transactions on Circuits and Systems for Video Technology, vol. 13, No. 7, Jul. 2003, pp. 614-619.
Shen-Yu Shih, et al, "A Near Optimal Deblocking Filter for H.264 Advanced Video Coding", 2006 IEEE, Dept. of Computer Science, National Tsing Hua University, Hsin-Chu, Taiwan 300, pp. 170-175.
Chao-Chung Cheng, et al, "An In-Place Architecture for the Deblocking Filter in H.264/AVC", IEEE Transactions on Circuits and Systems-II; Express Briefs, vol. 53, No. 7, Jul. 2006, pp. 530-534.
Thomas Wiegand, et al, "Overview of the H.264/AVC Video Coding Standard", IEEE Transactions on Circuits and Systems for Video Technology, Jul. 2003, pp. 1-19.
Hyun Wook Park, et al, "A Postproccessing Method for Reducing Quantization Effects in Low Bit-Rate Moving Picture Coding", IEEE Transactions on Circuits and Systems for Video Technology, vol. 9, No. 1, Feb. 1999, pp. 161-171.
Yung-Lyul Lee, et al, "Loop Filtering and Post-Filtering for Low-Bit-Rates Moving Picture Coding", Signal Processing: Image Communication 16 (2001), Dept. of Electrical Engineering, Korea Advanced Institute of Science and Technology, pp. 871-890.

* cited by examiner

*Primary Examiner* — Claire X Wang
*Assistant Examiner* — David Perlman
(74) *Attorney, Agent, or Firm* — Garlick & Markison; Bruce E. Stuckman

(57) ABSTRACT

A video filter processes a video input signal that includes a plurality of pixels in a plurality of macroblocks. The video filter includes an edge detector that processes a selected group of the plurality of pixels to generate a edge identification signal that identifies edge pixels in the selected group, wherein the edge detector is adapted based on a quantization parameter of at least one macroblock corresponding to the selected group of the plurality of pixels. An adaptive deblocking filter is coupled to receive the video input signal and to produce a processed video signal in response thereto, the adaptive deblocking filter being adaptive based on the edge identification signal.

14 Claims, 13 Drawing Sheets

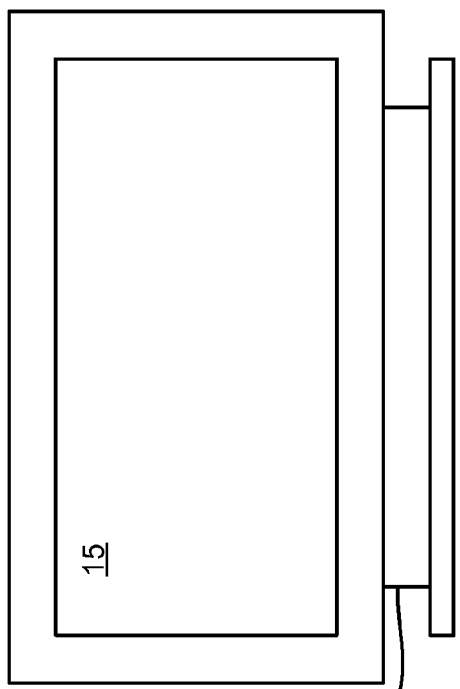
FIG. 1
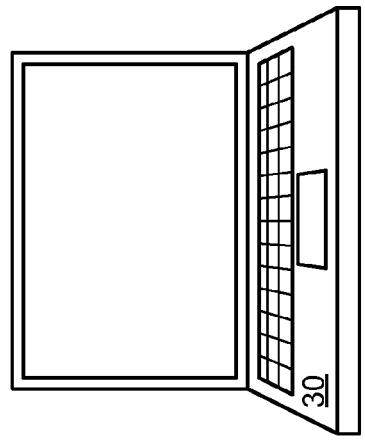
FIG. 3
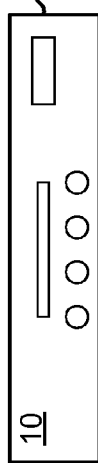
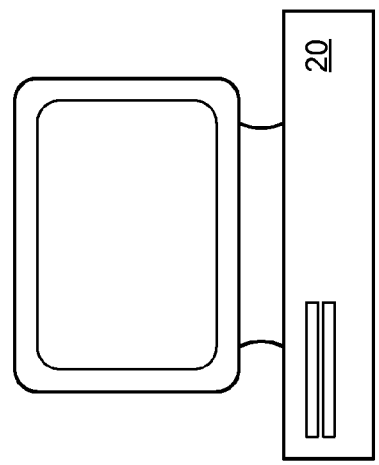
FIG. 2

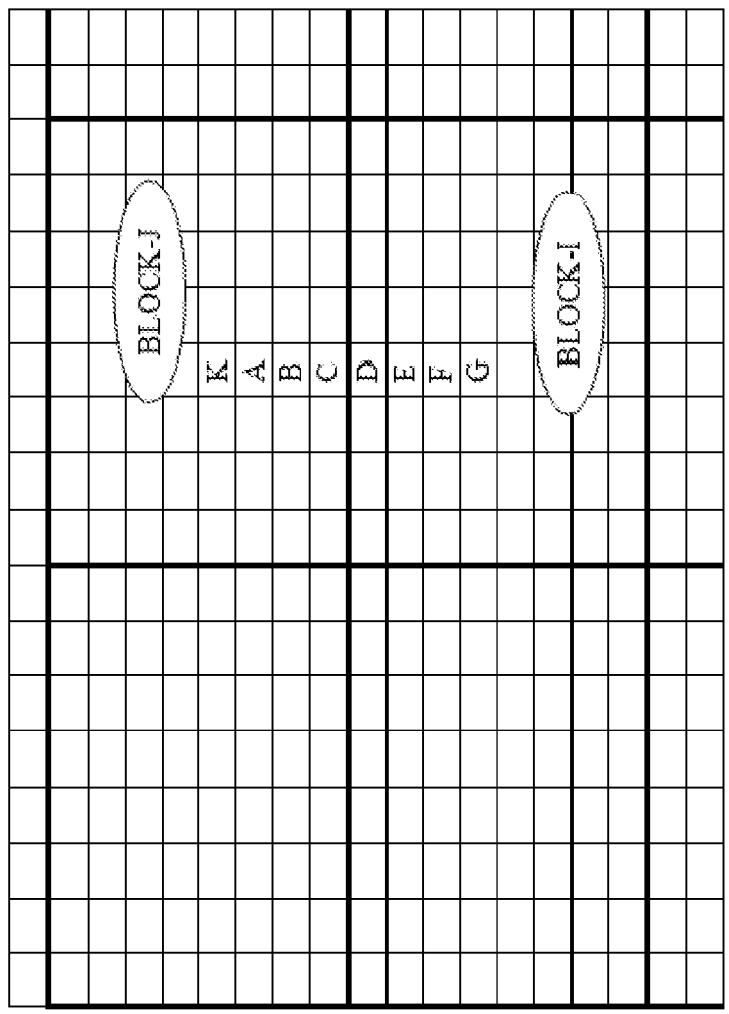

Video encoding operation

Video decoding operation

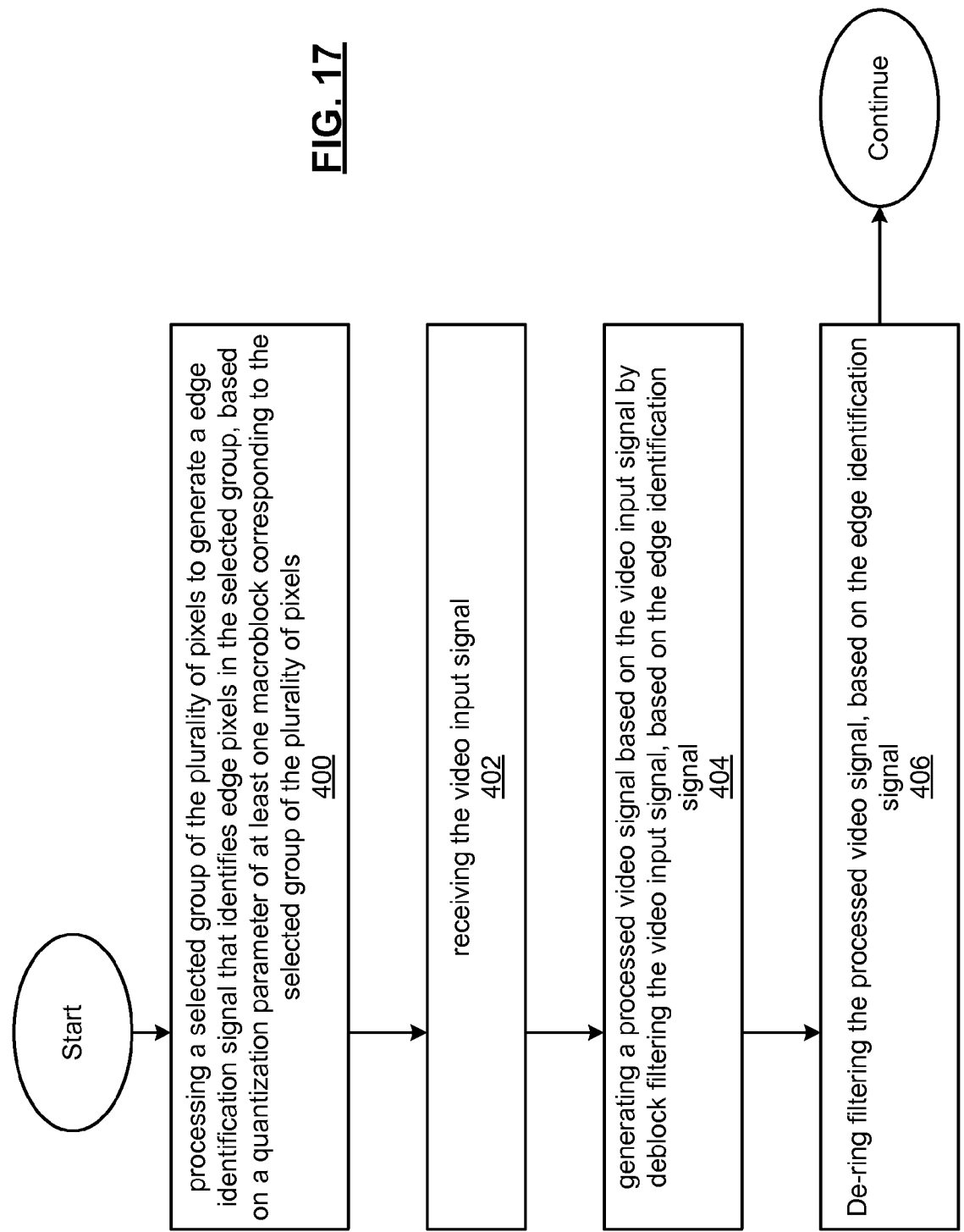

EDGE ADAPTIVE DEBLOCKING FILTER AND METHODS FOR USE THEREWITH

CROSS REFERENCE TO RELATED PATENTS

The present application is related to the U.S. application, DEBLOCKING FILTER WITH MODE CONTROL AND METHODS FOR USE THEREWITH, having Ser. No. 12/394,658, filed on Feb. 27, 2009.

TECHNICAL FIELD OF THE INVENTION

The present invention relates to deblocking filters and de-ringing filters used in video processing.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

Block-based coding, such as Motion Picture Expert Group (MPEG) coding introduces blocking artifacts between block boundaries. The reason is that the transform does not consider the correlation between block boundaries when blocks are independently coded. As result, the boundary area belonging to different blocks may be differently processed in the quantization step creating visual artifacts. The severity of these artifacts depends on different level of compression. In general, the lower the bit rate of a video stream, the severer the potential artifacts. Ringing is another artifact resulting from the compressed encoding. It typically appears as sharp oscillations along the edges of an object moving on a relatively flat background. Deblocking and deringing filters strive to correct for these artifacts.

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of various video devices in accordance with embodiments of the present invention.

FIG. 12 presents a graphical representation of a portion of video picture in accordance with another embodiment of the present invention.

FIG. 13 presents a graphical representation of a portion of video picture in accordance with another embodiment of the present invention.

FIG. 17 presents a flowchart representation of a method in accordance with an embodiment of the present invention.

Figure 4:
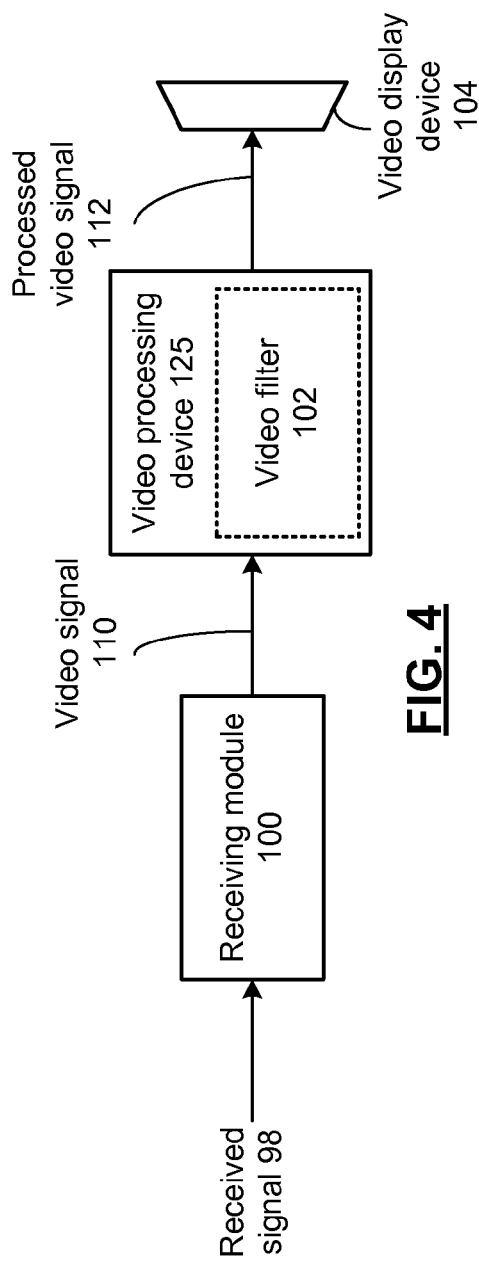
FIG. 4 presents a block diagram representation of a video system in accordance with an embodiment of the present invention.

DETAILED DESCRIPTION OF THE INVENTION INCLUDING THE PRESENTLY PREFERRED EMBODIMENTS

FIGS. 1-3 present pictorial diagram representations of various video devices in accordance with embodiments of the present invention. In particular, set top box 10 with built-in digital video recorder functionality or a stand alone digital video recorder, television or monitor 15, computer 20 and portable computer 30 illustrate electronic devices that incorporate a video device 125 that includes one or more features or functions of the present invention. While these particular devices are illustrated, video processing device 125 includes any device that is capable of filtering video content in accordance with the methods and systems described in conjunction with FIGS. 4-20 and the appended claims.

FIG. 4 presents a block diagram representation of a video device in accordance with an embodiment of the present invention. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video filter 102 and is coupled to the receiving module 100 to filter the video signal for storage, editing, and/or playback in a format corresponding to video display device 104.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include a digital video signal that has been coded in compliance with a digital video codec standard such as a Motion Picture Experts Group (MPEG) format (such as MPEG1, MPEG2 or MPEG4), Quicktime format, Real Media format, Windows Media Video (WMV), or Audio Video Interleave (AVI), etc. and is being post process filtered by video filter 102 to reduce or eliminate blocking artifacts introduced by this coding.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

In accordance with an embodiment the present invention, the video filter 102 includes a deblocking filter and/or a de-ringing filter that includes an adaptive edge detector that uses quantizer scale directly retrieved from macroblocks of a video stream for filtering. A frame/field adaptive vertical deblocking filter can be included that is adaptive based on the encoding type and further based on motion prediction. Video filter 102 includes many optional functions and features described in conjunction with FIGS. 5-20 that follow.

Figure 5:
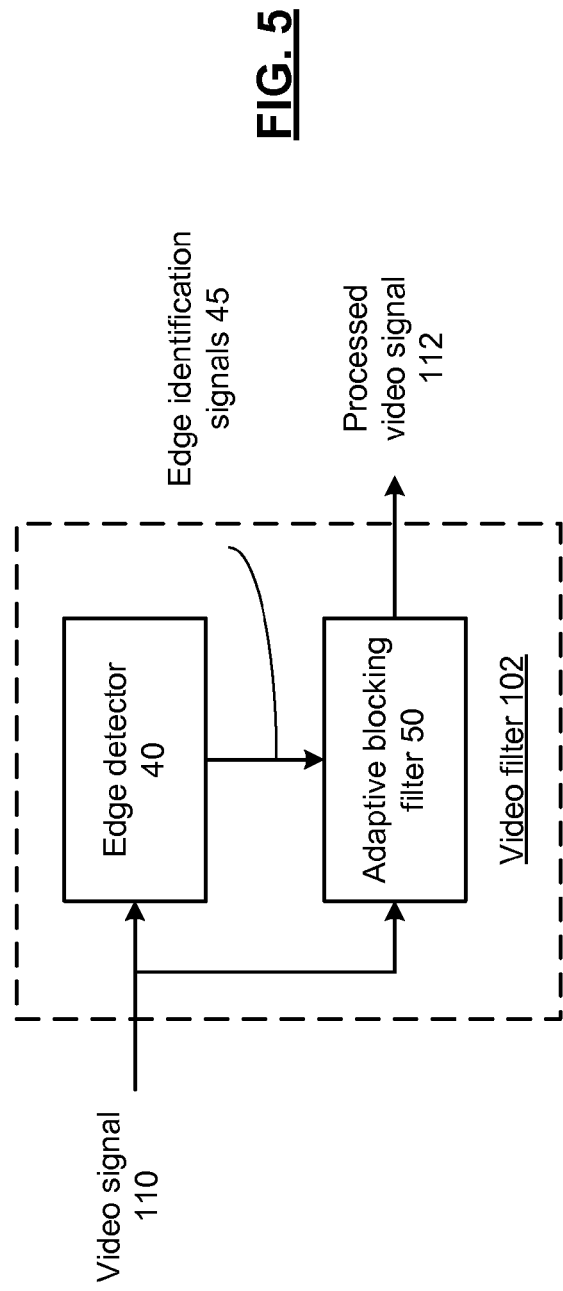
FIG. 5 presents a block diagram representation of a video filter 102 in accordance with an embodiment of the present invention.

FIG. 5 presents a block diagram representation of a video filter 102 in accordance with an embodiment of the present invention. In particular, a video filter 102 is shown as described in conjunction with FIG. 4. An edge detector 40 processes a selected group of the plurality of pixels, such as a sliding window of pixels or other group, to generate edge identification signals 45 that identify edge pixels in the selected group. The edge detector 40 is adapted based on a quantization parameter of one or more macroblocks corresponding to the selected group of the plurality of pixels. An adaptive deblocking filter 50 is adaptive based on the edge identification signals 45, and produces processed video signal 112 in response to the video input signal 110.

Edge detector 40 and adaptive deblocking filter 50 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Such a memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In an embodiment of the present invention, edge detector 40 generates a detection signal that detects when a single macroblock encompasses the selected group of the plurality of pixels and when two macroblocks encompass the selected group of the plurality of pixels. When a single macroblock is detected, the edge detector 40 uses/generates a quantization parameter proportional to a quantization parameter of the single macroblock. When two macroblocks encompass the selected group of the plurality of pixels, edge detector 40 generates a quantization parameter proportional to the average of the two quantization parameters that correspond to the two macroblocks.

The edge detector 40 generates the edge identification signal 45 by generating a plurality of pixel differences based on the selected group of the plurality of pixels; generating a plurality of thresholds based on the quantization parameter; and identifying edge pixels based on a comparison of the plurality of pixel differences to the plurality of thresholds.

In this fashion, edge detector 40 generates edge identification signals 45 that identify those pixels in a picture that are edge pixels and those pixels that are not edge pixels.

Figure 6:
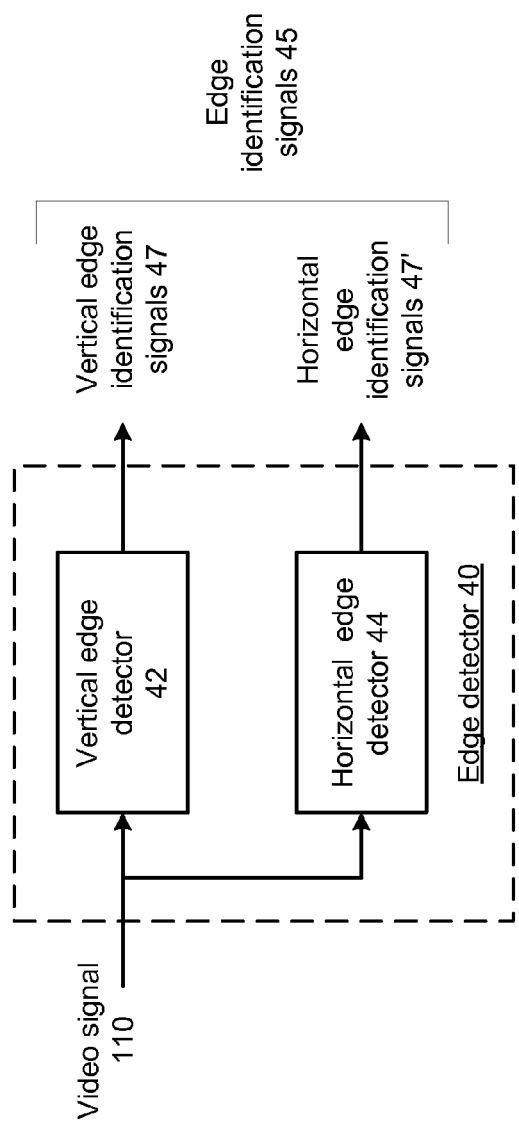
FIG. 6 presents a block diagram representation of an edge detector 40 in accordance with an embodiment of the present invention.

FIG. 6 presents a block diagram representation of an edge detector 40 in accordance with an embodiment of the present invention. In this embodiment, edge detector 40 includes a horizontal edge detector 42 that identifies horizontal edge pixels based on horizontal groups of pixels and a vertical edge detector that identifies vertical edge pixels based on vertical groups of pixels. The edge identification signals 45 include horizontal edge identification signals 47 that identify horizontal edge pixels and vertical edge identification signals 47' that identify vertical edge pixels, in particular for use in conjunction with separate horizontal and vertical deblock filtering that will be discussed further in conjunction with FIGS. 9-12. In this fashion, edge detector 40 generates edge identification signals 45 that identify those pixels in a picture that are vertical edge pixels, horizontal edge pixels and those pixels that are not edge pixels of either kind.

Figure 7:
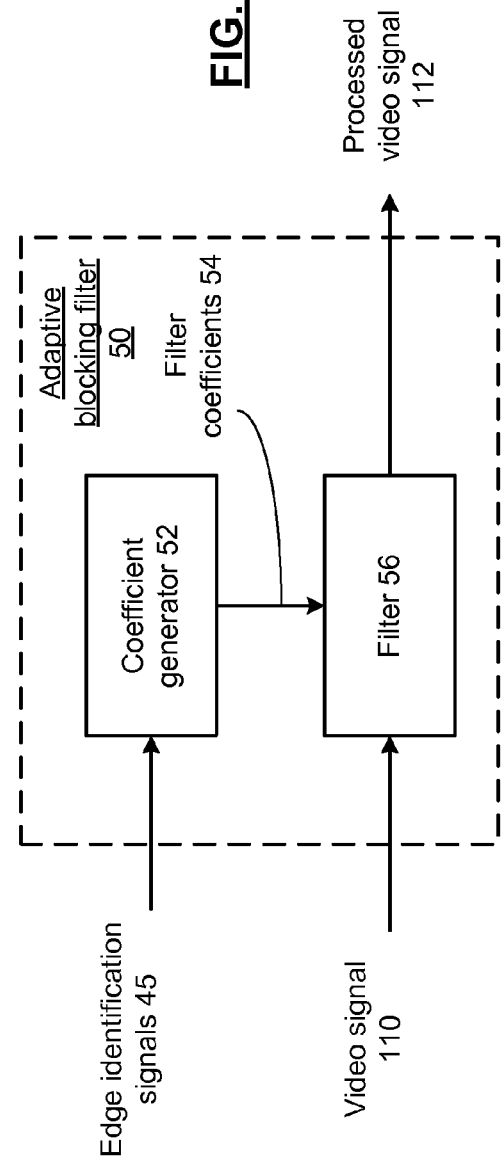
FIG. 7 presents a block diagram representation of an adaptive blocking filter 50 in accordance with an embodiment of the present invention.

FIG. 7 presents a block diagram representation of an adaptive blocking filter 50 in accordance with an embodiment of the present invention. In this case, the adaptive deblocking filter 50 includes a coefficient generator 52 that generates a plurality of filter coefficients 54 based on the edge identification signals 45. A filter 56 deblock filters the video input signal 110 based on the plurality of filter coefficients 54. In an embodiment of the present invention, the coefficient generator employs a look up table to look-up a set of filter coefficients 54, based on the edge identification signals 45. For instance, the coefficient generator 52 operates based on a set of pixels in a picture, such as a sliding window or other set of pixels. The coefficient generator 52 processes the set of pixels, based on the edge identification signals 45 for that set of pixels, to generate a set pattern. This set pattern can be a pattern of pixel states for each pixel of the set, such as an edge detected state, a no edge detected state and a do not care state. Coefficient generator 52 can generate the filter coefficients 54 by identifying in the look-up table the particular filter coefficients 54 that correspond to the identified set pattern.

Figure 8:
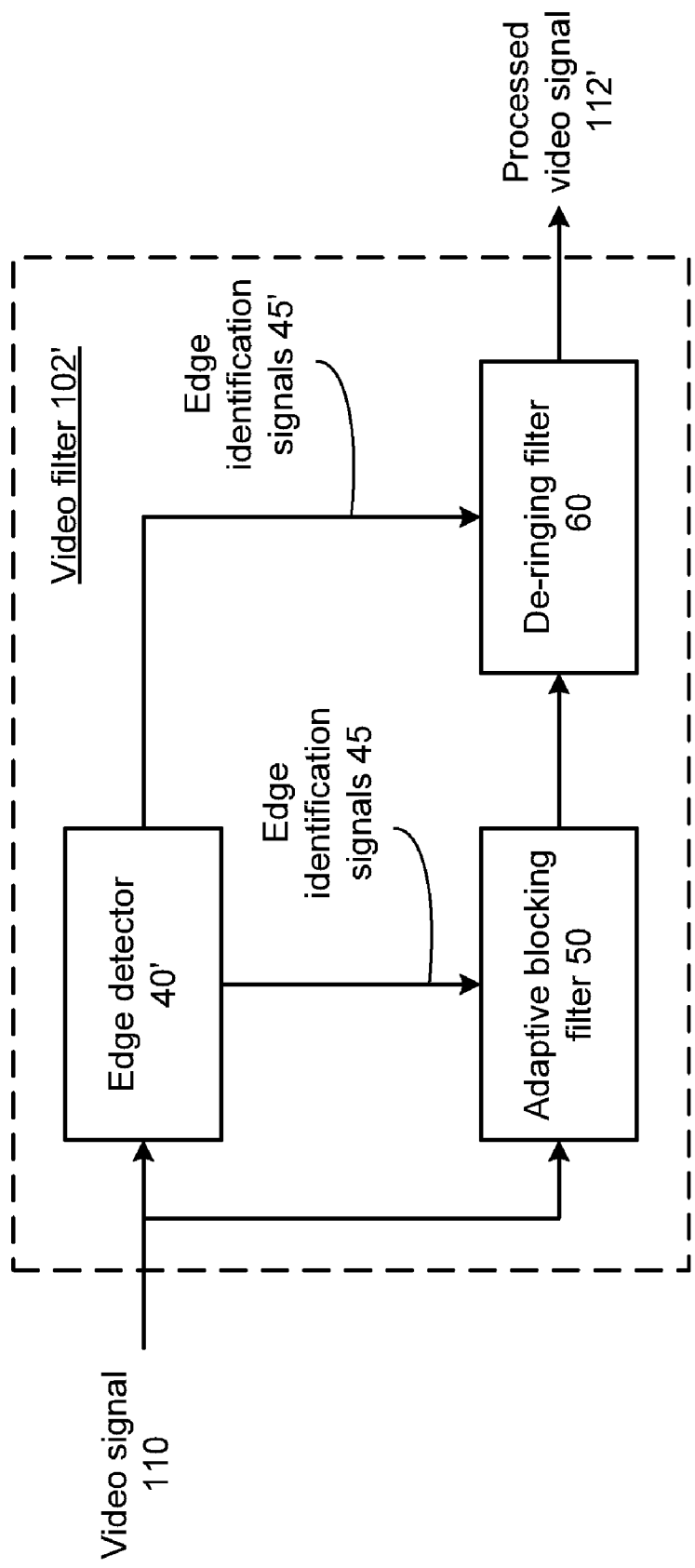
FIG. 8 presents a block diagram representation of a video filter 102' in accordance with an embodiment of the present invention.

FIG. 8 presents a block diagram representation of a video filter 102' in accordance with an embodiment of the present invention. In particular, video filter 102' includes similar elements to video filter 102 that are referred to by common reference numerals. In addition, video filter 102' includes a de-ringing filter 60 that is coupled to generate the processed video signal 112', based on the filtered result of the adaptive blocking filter 50 and further based on additional edge identification signals 45'. In addition to performing the functions of edge detector 40, edge detector 40' further generates edge identification signals 45'. These additional edge identification signals can be calculated differently for de-ringing filter 60, based on the filtered result of adaptive blocking filter 50. Like the edge detector 40, edge detector 40' can include a horizontal edge detector that identifies horizontal edge pixels and a vertical edge detector that identifies vertical edge pixels and indicates these horizontal and vertical edge pixels in edge identification signals 45'.

Figure 9:
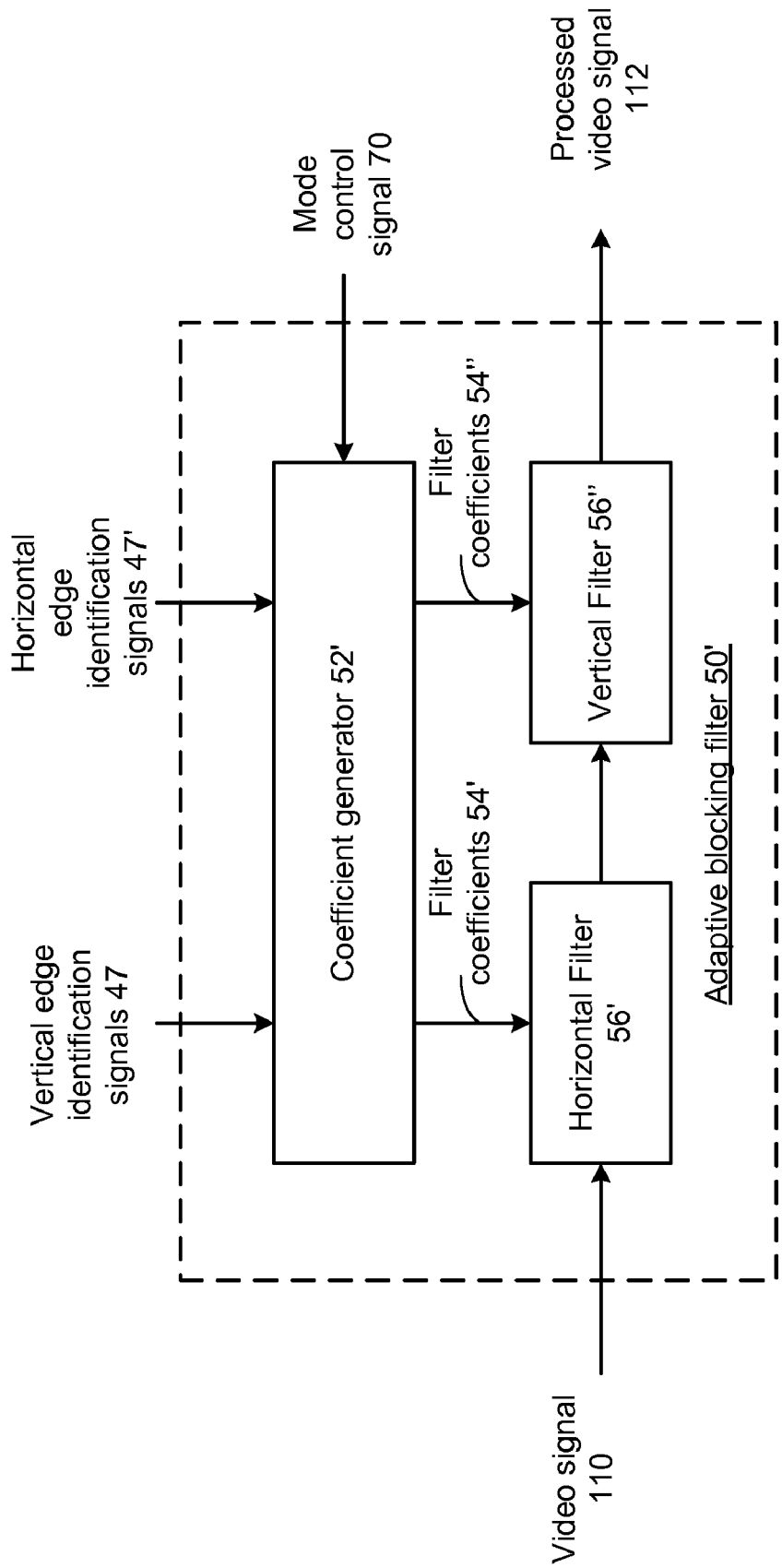
FIG. 9 presents a block diagram representation of an adaptive blocking filter 50' in accordance with an embodiment of the present invention.

FIG. 9 presents a block diagram representation of an adaptive blocking filter 50' in accordance with an embodiment of the present invention. In particular, adaptive blocking filter 50' includes a coefficient generator 52' that generates a plurality of horizontal filter coefficients 54' and a plurality of vertical filter coefficients 54" based on the horizontal edge identification signals 47' and the vertical edge identification signals 47 and optionally based on mode control signal 70 described further in conjunction with FIG. 10. The filter stage includes a horizontal filter 56', such as horizontal deblocking filter, that filters based on the horizontal filter coefficients 54' to produce a filtered video signal. A vertical filter 56", such as a vertical deblocking filter, filters the filtered video signal based on the vertical filter coefficients 54" and further based on a mode control signal 70.

Figure 10:
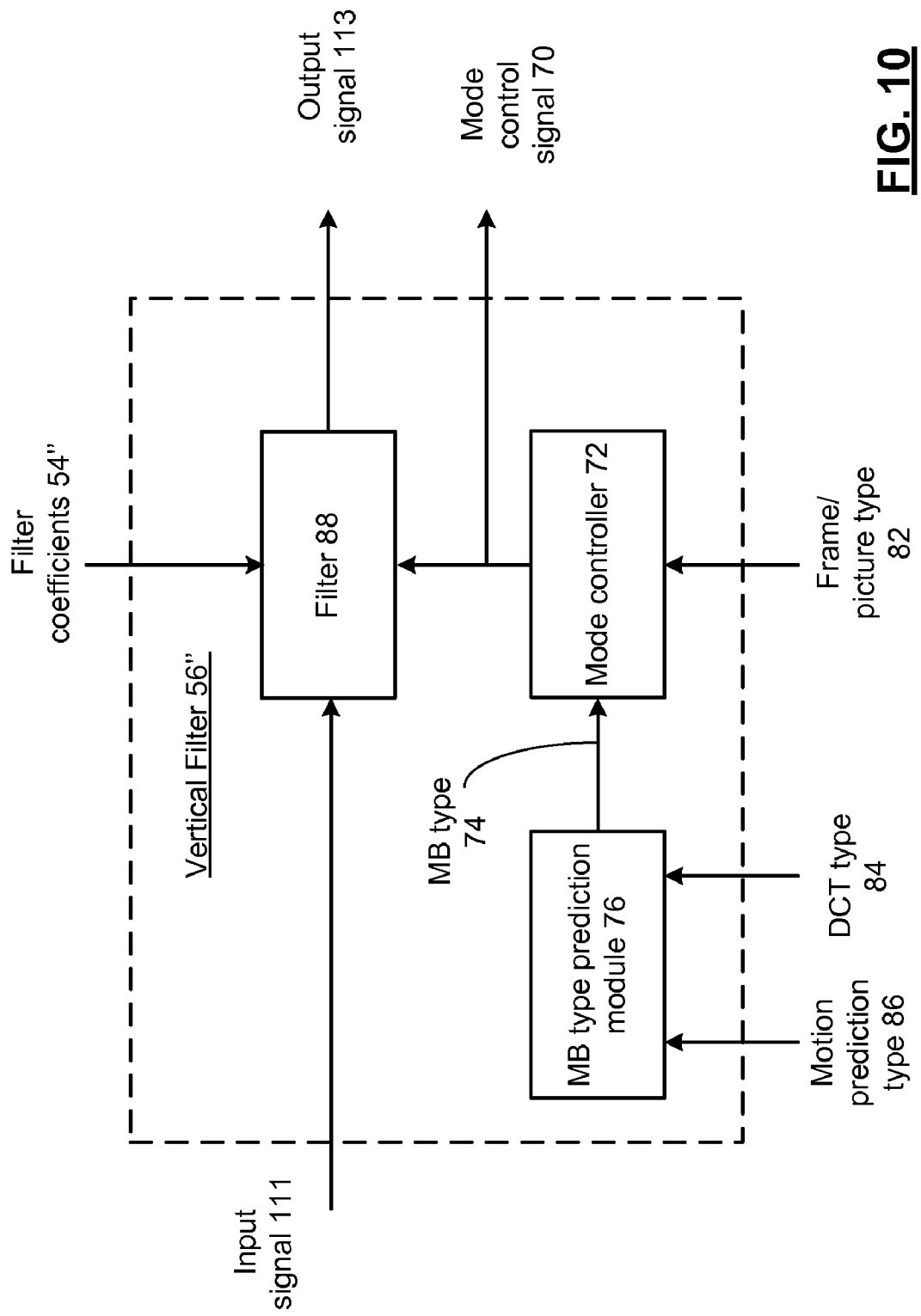
FIG. 10 presents a block diagram representation of a vertical filter 56" in accordance with an embodiment of the present invention.

A further implementation of vertical filter 56' is presented in conjunction with FIG. 10 that follows.

FIG. 10 presents a block diagram representation of a vertical filter 56" in accordance with an embodiment of the present invention. In particular, vertical filter 56" includes a mode controller 72 that generates a mode control signal 70 based on a frame type and a picture type included in frame/picture type 82. The mode control signal can indicate a plurality of filter modes such as a filter disabled mode, a vertical frame deblock mode and/or a vertical field deblock mode. The frame/picture type 82 can indicate a frame type, such as an interlaced frame type or a progressive frame type. In addition, the frame/picture type 82 can indicate a picture type for each picture in the filtered video signal, such as a frame picture type and a field picture type.

Filter 88 is adapted based on the use of different filter coefficients 54". The filter coefficients 54" are calculated based on both horizontal edge detection signals 47' and mode control signals 70 to selectively enable the filter 88, and to provide coefficients in either a vertical frame deblock mode or a vertical field deblock mode or to disables the filter 88 by providing pass-through coefficients. When the filter 88 is selectively enabled, the filter 88 vertical deblock filters the input signal 111, such as the filtered video signal from the horizontal blocking filter, to generate the output signal 113, such as the processed video signal 112. When disabled, the input signal 111 can be passed as the output signal 113.

In an embodiment of the present invention, the filter 88 is selectively enabled when the mode control signal indicates the interlaced frame type.

As further shown a macroblock type prediction module 76 generates a macroblock type signal 74 for macro blocks in the analyzed pictures based on the motion prediction type 86 and the DCT type 84. The mode controller 72 further generates the mode control signal 70 based on the macroblock type signal 74. In an embodiment of the present invention the macroblock type signal can indicate the frame/field type of a macroblock in relation to an adjacent macroblock. For instance, the macroblock type signal can indicate: a "frame macroblock adjacent to frame macroblock" type; a "field macroblock adjacent to field macroblock" type; and a "frame macroblock adjacent to field macroblock" type.

The filters described in conjunction with FIGS. 1-10 will be discussed further in light of a particular example that includes many optional functions and features and that is presented in conjunction with FIGS. 11-13. This example considers de-blocking/de-ringing as post-processing techniques for a video stream that was previously coded using block-based coding technique, such as an MPEG technique, where pictures are coded based on a plurality of pixel macroblocks. This example assumes that macroblocks are always saved as a frame. That is, if the video is progressive, the frame is stored as row 1, 2, 3 . . . ; and if the video is interlaced, the frame is stored as interleaved top field and bottom field—top row 1, bottom row 1, top row 2, bottom row 2, . . . etc. This example also assumes that both the input video source and output are 8 bits. However, the processing performed by video filter 102 can employ a greater number of bits, in-process, such as 10 bits for better accuracy.

Figure 11:
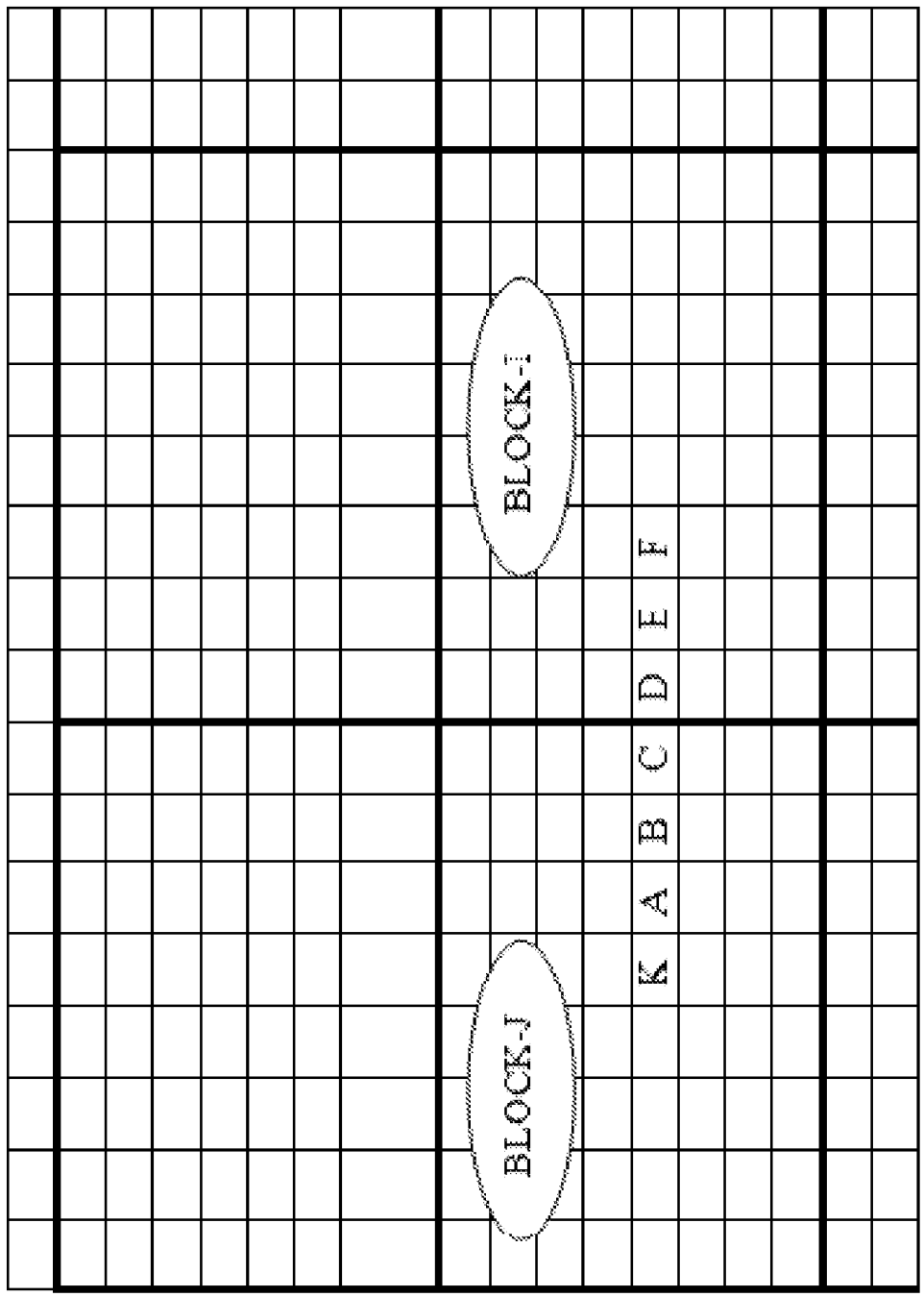
FIG. 11 presents a graphical representation of a portion of video picture in accordance with an embodiment of the present invention.

FIG. 11 presents a graphical representation of a portion of video picture in accordance with an embodiment of the present invention. In particular, a portion of a picture is shown that is segregated in to macroblocks, such as 16×16 macroblocks, that each contain blocks such as block J and block I that are 8×8 pixels in dimension. Individual boxes represent individual pixels such as pixels K, A, B, C, D, E, and F. Horizontal and vertical block boundaries are presented as bold lines. In this case, the boundary between blocks I and J is also a macroblock boundary and not a block boundary contained within a single macroblock.

In this example, a horizontal filter, such as horizontal filter 56' reduces artifacts caused by vertical block boundaries and a vertical filter, such as vertical filter 56" reduces artifacts caused by horizontal block boundaries. As previously discussed, each filter is edge adaptive, so on each step, edge pixels are detected by an edge detector, such as edge detector 40 or 40', and filter coefficients are determined, such as via coefficient generator 52', before each filter is applied.

Edge detector 40 or 40' performs edge detection for the horizontal filter based on the horizontal gradient operators on the horizontal and the vertical block boundaries in FIG. 11. The edge detector 40 or 40' operates based on a 1×7 group of pixels, such as pixels K, A, B, C, D, E, and F having group indices 1, 2, . . . 6 respectively. This group of pixels is moved in an iterative process to encompass an entire picture being processed. The edge detector generates a vertical edge identification signal 47 called Edge[6], which is a 1×6 array defined by the following pseudocode:

```
If ( |K−A|>T1) Edge [0] =1;
    else              Edge[0]=0;
If( |A−B|>T1 ) Edge[1]=1;
    else              Edge[1]=0;
If( |B−C|>T1 ) Edge[2]=1;
    else              Edge[2]=0;
If( |C−D|>T2 ) Edge[3]=1;
    else              Edge[3]=0;
If( |D−E|>T3 ) Edge[4]=1;
    else              Edge[4]=0;
If( |E−F|>T3 ) Edge[5]=1;
    else              Edge[5]=0;
``` where, Edge[N]=1 indicates that pixel N is an edge pixel and Edge[N]=0 indicates that pixel N is not an edge pixel.

The edge detector 40 or 40' is adapted based on a quantization factor. In particular, the thresholds, T1, T2 and T3, are selected as follows, T1=Ma1*QP(left)+Ta1 (default: Ta1=2)
T2=Ma2*[QP(left)+QP(right)]/2+Ta2 (default: Ta2=−4)
T3=Ma1*QP(right)+Ta1 (default: Ta1=2)
where the parameter QP is the quantization factor of each macro block (if the MB is skipped, QP from the previous non-skipped MB is used; if not available, the quantization factor of each slice is used) if only one macro block is involved. When two macro blocks are involved (such as the case shown in FIG. 11 where the 1×7 group of pixels K, A, B, C, D, E, and F are encompassed by two macroblocks), then the average of the two QP's belonging to the two macroblocks is used. Ta1 and Ta2 are signed 8 bits integer (−128~127). Ma1 and Ma2 are unsigned 4 bits integers. T1, T2 and T3 are the same no matter if frame mode or field mode is employed.

The horizontal filter 56' can be an 1-D filter that is applied to four points (B, C, D and E) in the reconstructed frame. Since there are no neighboring pixels on the frame boundary and block-ness is not an issue in that area, no filter is applied for the pixel on the frame boundary. In addition, the weights are also adaptively changed depending on the other pixels are edge pixels or not. In particular, for any central pixel P2, in the following table,

| P0 | P1 | P2 | P3 |
|----|----|----|----|

The filter is applied as below, in which P2' is the filter result of original pixel P2. The generalized format of the filter:

P2'=(Dch_0*P0+Dch_1*P1+Dch_2*P2+Dch_3*P3+Dch_SUM/2)/Dch_SUM

Where, (Dch_0, Dch_1, Dch_0, Dch_0), represent the horizontal filter coefficients 54', Dch_SUM=(Dch_0+Dch_1+Dch_2+Dch_3). To simplify hardware implementations, the Dch_Sum can be a constant (power of two) such as 16, 32, etc.

Coefficient generator 52' determines the values of the filter coefficients 54'. In this example, the coefficient generator 52' operates based on a 1×4 set of pixels and identifies a set pattern based on the edge states of these pixels. Specifically, E represents an edge pixel state, N represents a non-edge pixel state, and X represents a do-not-care state for each corresponding pixel position (P0, P1, P2, P3). Coefficient generator 52' identifies the set pattern as belonging to one of the following six cases and, via look-up table, assigns values for each of the filter coefficients 54'. The resulting horizontal filter 56' for each case is also shown. The range of Dch_0~Dch_3 can be 0~15 as shown below. As previously discussed, for the purpose of accuracy, the horizontal filter result can be stored in 10 bits for later processing. If the input is 8 bits (0~255), then the filter output can be normalized to 10 bits (0~1023).

Case 1)

| N | N | N | X |
|---|---|---|---|

Condition is equivalent to |P0−P1|<=T AND |P1−P2|<=T AND |P2−P3|<=T [where T is the corresponding threshold value (T1, T2 or T3) described previously.]
2Dch3_0=2; Dch3_1=3; Dch3_2=8; Dch3_3=3; Dch_SUM=16
Which is equivalent to P2'=(2*P0+3*P1+8*P2+3*P3+8)>>2

Case 2)

| E | N | N | X |
|---|---|---|---|

Condition is equivalent to |P0−P1|>T AND |P1−P2|<=T AND |P2−P3|<=T
Dch1_0=0; Dch1_1=4; Dch1_2=8; Dch1_3=4; Dch_SUM=16
Which is equivalent to P2'=(4*P1+8*P2+4*P3+8)>>2

Case 3)

| X | E | N | X |
|---|---|---|---|

Condition is equivalent to |P1−P2|>T AND |P2−P3|<=T
Dch2_0=0; Dch2_1=0; Dch2_2=10; Dch2_3=6; Dch_SUM=16
Which is equivalent to P2'=(10*P2+6*P3+8)>>2

Case 4)

| N | N | E | X |
|---|---|---|---|

Condition is equivalent to |P0−P1|<=T AND |P1−P2|<=T AND |P2−P3|>T
Dch4_0=4; Dch4_1=4; Dch4_2=8; Dch4_3=0; Dch_SUM=16
Which is equivalent to P2'=(4*P0+4*P1+8*P2+8)>>2

Case 5)

| E | N | E | X |
|---|---|---|---|

Condition is equivalent to |P0−P1|>T AND |P1−P2|<=T AND |P2−P3|>T
Dch5_0=0; Dch5_1=6; Dch5_2=10; Dch5_3=0; Dch_SUM=16
Which is equivalent to P2'=(6*P1+10*P2+8)>>2

If there is a situation not listed in the five cases above, then P2'←P2, i.e., P2 remains unchanged. I.e., case 6) below.

Case 6)
For all cases not listed in case 1)~5)
Dch6_0=0; Dch6_1=0; Dch6_2=16; Dch6_3=0; Dch_SUM=16
Which is equivalent to P2'=P2

Continuing with the example above, the vertical filter 56" can be applied in a similar way to the horizontal filter 56', however, there are exceptions. When the input is interlaced, the picture in different fields may have little spatial correlation. In this case, the vertical filter 56' can be enabled to apply deblocking in the same polarity fields (i.e., top with top and bottom with bottom), i.e., field mode, rather than frame mode. In addition, the filter can selectively disabled.

The list below reflects the operation of mode controller 72 via a look up table or otherwise to determine a particular mode to be indicated by mode control signal 70. As shown below, the mode controller identifies the particular mode by identifying one of the eight cases below, based on the frame type, picture type and MB type.

Case 1)
Frame type: progressive frame
Picture type: frame picture

MB type: frame MB adjacent to frame MB
Mode: enable vertical frame DBK
Case 2)
Frame type: progressive frame
Picture type: frame picture
MB type: frame MB adjacent to field MB
Mode: filter disabled
Case 3)
Frame type: progressive frame
Picture type: frame picture
MB type: field MB adjacent to field MB
Mode: filter disabled
Case 4)
Frame type: progressive frame
Picture type: field picture
MB type: (any MB type)
Mode: filter disabled
Case 5)
Frame type: interlaced frame
Picture type: frame picture
MB type: frame MB adjacent to frame MB
Mode: enable vertical frame DBK (default); enable vertical field DBK (option)
Case 6)
Frame type: interlaced frame
Picture type: frame picture
MB type: frame MB adjacent to field MB
Mode: enable vertical field DBK
Case 7)
Frame type: interlaced frame
Picture type: frame picture
MB type: field MB adjacent to field MB
Mode: enable vertical field DBK
Case 8)
Frame type: interlaced frame
Picture type: field picture
MB type: (any MB type)
Mode: enable vertical frame DBK In this example, macroblock type prediction module 76 determines if a particular macroblock X is in frame mode or field mode for the purposes of the vertical filter 56" using a look-up table based on motion prediction type 86 as well as DCT type 84. If a macroblock is in frame prediction and frame DCT type; then the macroblock is determined to be in frame mode. If the macroblock is an intra macroblock and the macroblock's DCT type is field, then the macroblock is determined to be in field mode. If the macroblock is an intra macroblock and the macroblock's DCT type is frame, then the macroblock is determined to be in frame mode. For other macroblocks, if their motion prediction is frame based, then they are in frame mode, otherwise that are determined to be in field mode. Simply, for intra macroblocks, the macroblock type prediction module 76 relies on DCT type 84 and uses motion prediction 86 otherwise. Macroblock type prediction module 76 generates the macroblock type 74 based on the type of the current macroblock and the type and an adjacent macroblock type.

FIG. 12 presents a graphical representation of a portion of video picture in accordance with another embodiment of the present invention. In particular, a portion of a picture is shown that is segregated in to macroblocks containing block J and block I that are 8×8 pixels in dimension. Individual boxes represent individual pixels such as pixels K, A, B, C, D, E, F and G. Horizontal and vertical block boundaries are presented as bold lines. In this case, the boundary between blocks I and J is also a macroblock boundary.

In this example, when the current block (BLOCK-I in FIG. 12) and the adjacent block (BLOCK-J in FIG. 12) are both in frame mode, it is likely that the block has little motion or in a smooth area since the spatial correlation is strong. Filter 88 operates in a similar fashion to the horizontal filter, with coefficients [Dcv] determined by coefficient generator 52' based on whether mode control signal 72 indicates vertical frame mode or vertical field mode. Examples of the filter coefficients [Dcv] are presented below.

Filter Coefficients 54" (Frame Mode):
$Dcv1\_0=1; Dcv1\_1=2; Dcv1\_2=11; Dcv1\_3=2;$
$Dcv2\_0=0; Dcv2\_1=3; Dcv2\_2=10; Dcv2\_3=3;$
$Dcv3\_0=0; Dcv3\_1=0; Dcv3\_2=12; Dcv3\_3=4;$
$Dcv4\_0=3; Dcv4\_1=3; Dcv4\_2=10; Dcv4\_3=0;$
$Dcv5\_0=0; Dcv5\_1=3; Dcv5\_2=10; Dcv5\_3=3;$
$Dcv6\_0=0; Dcv6\_1=0; Dcv6\_2=16; Dcv6\_3=0;$ Filter Coefficients 54" (Field Mode):
$Dcvf1\_0=1; Dcvf1\_1=2; Dcvf1\_2=11; Dcvf1\_3=2;$
$Dcvf2\_0=0; Dcvf2\_1=3; Dcvf2\_2=10; Dcvf2\_3=3;$
$Dcvf3\_0=0; Dcvf3\_1=0; Dcvf3\_2=12; Dcvf3\_3=4;$
$Dcvf4\_0=3; Dcvf4\_1=3; Dcvf4\_2=10; Dcvf4\_3=0;$
$Dcvf5\_0=0; Dcvf5\_1=3; Dcvf5\_2=10; Dcvf5\_3=3;$
$Dcvf6\_0=0; Dcvf6\_1=0; Dcvf6\_2=16; Dcvf6\_3=0;$ For vertical deblocking, edge detector 40 or 40' generally determines horizontal edge detection signals 47' in a similar fashion to vertical edge detection, but based on edge threshold values (T4, T5, T6) used in place of (T1, T2, T3), respectively. The values of (T4, T5, T6) for vertical de-blocking are determined by edge detector 40 or 40' based on:

T4=Ma3*QP(upper macroblock)+Ta3 (default: Ta3=2)
T5=Ma4*[QP(upper)+QP(lower)]/2+Ta4 (default: Ta4=−4)
T6=Ma3*QP(lower macroblock)+Ta3 (default: Ta3=2)

Where Ta3 and Ta4 are signed 8 bits integer (−128~127). Ma3 and Ma4 are unsigned 4 bits integers. However, when at least one of the two adjacent blocks (BLOCK-I and BLOCK-J) is in field mode, then edge detector 40 or 40' applies the following process:

```
If( |K−B|>T7 ) Edge[0]=1;
else              Edge[0]=0;
If( |A−C|>T7 ) Edge[1]=1;
else              Edge[1]=0;
If( |B−D|>T8 ) Edge[2]=1;
else              Edge[2]=0;
If( |C−E|>T8 ) Edge[3]=1;
else              Edge[3]=0;
If( |D−F|>T9 ) Edge[4]=1;
else              Edge[4]=0;
If( |E−G|>T9 ) Edge[5]=1;
else              Edge[5]=0;
``` where thresholds, T7, T8 and T9, are selected as follows,
T7=Ma5*QP(lower macroblock)+Ta5 (default: Ta5=2)
T8=Ma6*[QP(lower)+QP(upper)]/2+Ta6 (default: Ta6=−4)
T9=Ma5*QP(upper macroblock)+Ta5 (default: Ta5=2)

and where the parameter QP is the quantization factor determined as previously described, Ta5 and Ta6 are signed 8 bits integer (−128~127). Ma5 and Ma6 are unsigned 4 bits integers.

In the preceding case, the coefficient generator 52' can apply the following set pattern identification to the four pixels B, C, D, E, with vertical filter 56" being configured to apply two separate filters on each field:

Top Field
Case 1
　If Edge[0] AND Edge[2] AND Edge[4] are not edge pixels

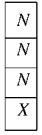

$B \leftarrow (Dcvf1\_3 * K + Dcvf1\_2 * B + Dcvf1\_1 * D + Dcvf1\_0 * F + Dcvf\_SUM/2)/Dcvf\_SUM;$
$D \leftarrow (Dcvf1\_0 * K + Dcvf1\_1 * B + Dcvf1\_2 * D + Dcvf1\_3 * F + Dcvf\_SUM/2)/Dcvf\_SUM;$ Case 2
　Else if Edge[0] is edge pixel AND Edge[2] AND Edge[4] are not edge pixels

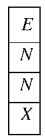

$B \leftarrow (Dcvf4\_3 * K + Dcvf4\_2 * B + Dcvf4\_1 * D + Dcvf4\_0 * F + Dcvf\_SUM/2)/Dcvf\_SUM;$
$D \leftarrow (Dcvf2\_0 * K + Dcvf2\_1 * B + Dcvf2\_2 * D + Dcvf2\_3 * F + Dcvf\_SUM/2)/Dcvf\_SUM;$ Case 3
　Else if Edge[4] is edge pixel AND Edge[0] AND Edge[2] are not edge pixels

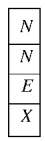

$B \leftarrow (Dcvf2\_3 * K + Dcvf2\_2 * B + Dcvf2\_1 * D + Dcvf2\_0 * F + Dcvf\_SUM/2)/Dcvf\_SUM;$
$D \leftarrow (Dcvf4\_0 * K + Dcvf4\_1 * B + Dcvf4\_2 * D + Dcvf4\_3 * F + Dcvf\_SUM/2)/Dcvf\_SUM;$ Case 4
　Else if Edge[0] and Edge [4] are edge pixels AND Edge[2] is not

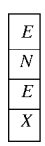

-continued $B \leftarrow (Dcvf3\_1 * K + Dcvf3\_2 * B + Dcvf3\_3 * D + Dcvf3\_0 * F + Dcvf\_SUM/2)/Dcvf\_SUM;$
$D \leftarrow (Dcvf3\_0 * K + Dcvf3\_3 * B + Dcvf3\_2 * D + Dcvf3\_1 * F + Dcvf\_SUM/2)/Dcvf\_SUM;$ Case 5
　Else $B \leftarrow (Dcvf6\_1 * K + Dcvf6\_2 * B + Dcvf6\_3 * D + Dcvf6\_0 * F + Dcvf\_SUM/2)/Dcvf\_SUM;$
$D \leftarrow (Dcvf6\_0 * K + Dcvf6\_1 * B + Dcvf6\_2 * D + Dcvf6\_3 * F + Dcvf\_SUM/2)Dcvf\_SUM;$ Bottom Field
Case 1
　If Edge[1] AND Edge[3] AND Edge[5] are not edge pixels

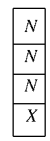

$C \leftarrow (Dcvf1\_3 * A + Dcvf1\_2 * C + Dcvf1\_1 * E + Dcvf1\_0 * G + Dcvf\_SUM/2)/Dcvf\_SUM;$
$E \leftarrow (Dcvf1\_0 * A + Dcvf1\_1 * C + Dcvf1\_2 * E + Dcvf1\_3 * G + Dcvf\_SUM/2)/Dcvf\_SUM;$ Case 2
　Else if Edge[1] is edge pixel AND Edge[3] AND Edge[5] are not edge pixels

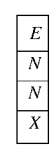

$C \leftarrow (Dcvf4\_3 * A + Dcvf4\_2 * C + Dcvf4\_1 * E + Dcvf4\_0 * G + Dcvf\_SUM/2)/Dcvf\_SUM;$
$E \leftarrow (Dcvf2\_0 * A + Dcvf2\_1 * C + Dcvf2\_2 * E + Dcvf2\_3 * G + Dcvf\_SUM/2)/Dcvf\_SUM;$ Case 3
　Else if Edge[5] is edge pixel AND Edge[1] AND Edge[3] are not edge pixels

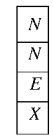

-continued $$C \leftarrow (Dcvf2\_3 * A + Dcvf2\_2 * C + Dcvf2\_1 * E +$$
$$Dcvf2\_0 * G + Dcvf\_SUM/2)/Dcvf\_SUM;$$
$$E \leftarrow (Dcvf4\_0 * A + Dcvf4\_1 * C + Dcvf4\_2 * E +$$
$$Dcvf4\_3 * G + Dcvf\_SUM/2)/Dcvf\_SUM;$$

Case 4
Else if Edge[1] and Edge [5] are edge pixels AND Edge[3] is not

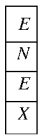

$$C \leftarrow (Dcvf3\_1 * A + Dcvf3\_2 * C + Dcvf3\_3 * E +$$
$$Dcvf3\_0 * G + Dcvf\_SUM/2)/Dcvf\_SUM;$$
$$E \leftarrow (Dcvf3\_0 * A + Dcvf3\_3 * C + Dcvf3\_2 * E +$$
$$Dcvf3\_1 * G + Dcvf\_SUM/2)/Dcvf\_SUM;$$

Case 5
Else $$C \leftarrow (Dcvf6\_1 * A + Dcvf6\_2 * C + Dcvf6\_3 * E +$$
$$Dcvf6\_0 * G + Dcvf\_SUM/2)/Dcvf\_SUM;$$
$$E \leftarrow (Dcvf6\_0 * A + Dcvf6\_1 * C + Dcvf6\_2 * E +$$
$$Dcvf6\_3 * G + Dcvf\_SUM/2)/Dcvf\_SUM;$$

No filter is applied for the pixel on the frame boundary.

In accordance with this example, the de-ringing filter 60 is also edge adaptive based on edge identification signals 45'. De-ringing filter 60 can employ a convolution filter in which the weighting factors for the convolution are varied depending on if the pixel is an edge pixel or not. When the central point of the filter window is on the edge pixel, the filtering operation is not performed. If no edge point is included in the filter window, low-pass filtering is performed. If some edge points, not on the center point, are in the filter window, weighted filtering to exclude the edge pixels is performed.

FIG. 13 presents a graphical representation of a portion of video picture in accordance with another embodiment of the present invention. In particular, a filter window is a 4-connected window is shown with pixels 70, 72, 74, 76, and 78 corresponding to pixels A, B, C, D, and E used below. Edge detector 40' generates edge detection signals 45' as described below:

For central pixel A (i.e., pixel [m] [n]):

```
/* Horizontal edge detection */
A1 = abs(pixel[m][n]–pixel[m][n + 1]) ;
A2 = abs(pixel[m][n]–pixel[m][n – 1]) ;
if ( (A1 >T10__1) or (A2 > T10__2))
    Edge[m][n] = 1;
else /* Vertical edge detection */
A3 = abs(pixel[m][n]–pixel[m + 1][n]) ;
A4 = abs(pixel[m][n]–pixel[m – 1][n]) ;
```

```
if ((A3 > T10__3) or (A4 > T10__4))
    Edge[m][n] = 1;
```

For up-neighbor pixel B (i.e., pixel [m] [n]):

```
/* Horizontal edge detection */
A1 = abs(pixel[m][n]–pixel[m][n + 1]) ;
A2 = abs(pixel[m][n]–pixel[m][n – 1]) ;
if ((A1 >T10__1) or (A2 > T10__2))
    Edge[m][n] = 1;
else /* Vertical edge detection */
A3 = abs(pixel[m][n]–pixel[m + 1][n]) ;
if (A3 > T10__3)
    Edge[m][n] = 1;
```

For left-neighbor pixel C (i.e., pixel [m] [n]):

```
/* Horizontal edge detection */
A1 = abs(pixel[m][n]–pixel[m][n + 1]) ;
if (A1 > T10__1)
    Edge[m][n] = 1;
else /* Vertical edge detection */
A3 = abs(pixel[m][n]–pixel[m + 1][n]) ;
A4 = abs(pixel[m][n]–pixel[m – 1][n]) ;
if ( (A3 > T10__3) or (A4 > T10__4))
    Edge[m][n] = 1;
```

For down-neighbor pixel D (i.e., pixel [m][n]):

```
/* Horizontal edge detection */
A1 = abs(pixel[m][n]–pixel[m][n + 1]) ;
A2 = abs(pixel[m][n]–pixel[m][n – 1]) ;
if ( (A1 >T10__1) or (A2 > T10__2))
    Edge[m][n] = 1;
else /* Vertical edge detection */
A4 = abs(pixel[m][n]–pixel[m – 1][n]) ;
if (A4 > T10__4)
    Edge[m][n] = 1;
```

For right-neighbor pixel E (i.e., pixel [m][n]):

```
/* Horizontal edge detection */
A2 = abs(pixel[m][n]–pixel[m][n – 1]) ;
if (A2 > T10__2)
    Edge[m][n] = 1;
else /* Vertical edge detection */
A3 = abs(pixel[m][n]–pixel[m + 1][n]) ;
A4 = abs(pixel[m][n]–pixel[m – 1][n]) ;
if ((A3 > T10__3) or (A4 > T10__4))
    Edge[m][n] = 1;
```

Where,
T10_x=Mb1*[(QP1+QP2)/2]+Tb1 (default: Tb1=0)
and where the parameter QP is the quantization factor of each macro block (if the MB is skipped, QP from the previous non-skipped MB is used; if not available, the quantization factor of each slice is used). If only one macro block is involved, QP1=QP2. When two macro blocks are involved, then the average of the two QP's belonging to the two macro blocks is used. Tb1 is a signed 8 bits integer (–128~127). Mb1 is an unsigned 4 bit integer.

The de-ringing filter 60 is adapted based on the particular edge pattern for pixels A, B, C, D, and E where 0 means a non-edge pixel and 1 means an edge pixel.

| A | B | C | D | E | Filter |
|---|---|---|---|---|---|
| 0 | 0 | 0 | 0 | 0 | A ← (4A + B + C + D + E + 4)/8 |
| 0 | 0 | 0 | 0 | 1 | A ← (4A + B + 2C + D + 4)/8 |
| 0 | 0 | 0 | 1 | 0 | A ← (4A + 2B + C + E + 4)/8 |
| 0 | 0 | 0 | 1 | 1 | A ← (2A + B + C + 2)/4 |
| 0 | 0 | 1 | 0 | 0 | A ← (4A + B + D + 2E + 4)/8 |
| 0 | 0 | 1 | 0 | 1 | A ← (2A + B + D + 2)/4 |
| 0 | 0 | 1 | 1 | 0 | A ← (2A + B + E + 2)/4 |
| 0 | 0 | 1 | 1 | 1 | A ← (A + B + 1)/2 |
| 0 | 1 | 0 | 0 | 0 | A ← (4A + C + 2D + E + 4)/8 |
| 0 | 1 | 0 | 0 | 1 | A ← (2A + C + D + 2)/4 |
| 0 | 1 | 0 | 1 | 0 | A ← (2A + C + E + 2)/4 |
| 0 | 1 | 0 | 1 | 1 | A ← (A + C + 1)/2 |
| 0 | 1 | 1 | 0 | 0 | A ← (2A + D + E + 2)/4 |
| 0 | 1 | 1 | 0 | 1 | A ← (A + D + 1)/2 |
| 0 | 1 | 1 | 1 | 0 | A ← (A + E + 1)/2 |
| 0 | 1 | 1 | 1 | 1 | A ← A |

More generally,
A←(DRc_0*A+DRc_1*B+DRc_2*C+DRc_3*D+DRc_4*E+DRc_5)/(DRc_SUM)
DRc_SUM=(DRc_0+DRc_1+DRc_2+DRc_3+DRc_4)
DRc_5=DRGCoeff_SUM/2

The range of DRGCoeff_0~DRGCoeff_4 is 0~15.
Specifically, for the table above, the following are default values for each coefficient:

| A | B | C | D | E | DRc_0 | DRc_1 | DRc_2 | DRc_3 | DRc_4 | DRc_5 |
|---|---|---|---|---|---|---|---|---|---|---|
| 0 | 0 | 0 | 0 | 0 | 8 | 2 | 2 | 2 | 2 | 8 |
| 0 | 0 | 0 | 0 | 1 | 8 | 2 | 4 | 2 | 0 | |
| 0 | 0 | 0 | 1 | 0 | 8 | 4 | 2 | 0 | 2 | |
| 0 | 0 | 0 | 1 | 1 | 8 | 4 | 4 | 0 | 0 | |
| 0 | 0 | 1 | 0 | 0 | 8 | 2 | 0 | 2 | 4 | |
| 0 | 0 | 1 | 0 | 1 | 8 | 4 | 0 | 4 | 0 | |
| 0 | 0 | 1 | 1 | 0 | 8 | 4 | 0 | 0 | 4 | |
| 0 | 0 | 1 | 1 | 1 | 8 | 8 | 0 | 0 | 0 | |
| 0 | 1 | 0 | 0 | 0 | 8 | 0 | 2 | 4 | 2 | |
| 0 | 1 | 0 | 0 | 1 | 8 | 0 | 4 | 4 | 0 | |
| 0 | 1 | 0 | 1 | 0 | 8 | 0 | 4 | 0 | 4 | |
| 0 | 1 | 0 | 1 | 1 | 8 | 0 | 8 | 0 | 0 | |
| 0 | 1 | 1 | 0 | 0 | 8 | 0 | 0 | 4 | 4 | |
| 0 | 1 | 1 | 0 | 1 | 8 | 0 | 0 | 8 | 0 | |
| 0 | 1 | 1 | 1 | 0 | 8 | 0 | 0 | 0 | 8 | |
| 0 | 1 | 1 | 1 | 1 | 16 | 0 | 0 | 0 | 0 | |

In a similar fashion to the vertical filter 56" the de-ringing filter 60 can respond to macroblock type 74 and frame/picture type 84 to be adapted based on frame type, picture type and MB type. In particular, the deranging filter 60 can further include its own mode controller that considers the frame type, picture type and macroblock type and that selects a mode via a look-up table or otherwise. In particular, deringing filter 60 can operate in either a "regular 2D" mode as described above or in a "horizontal only" mode only horizontal neighbors are involved in the de-ringing filter. A list of the cases for the operation is as below:

Case 1)
Frame type: progressive frame
Picture type: frame picture
MB type: frame MB adjacent to frame MB
Mode: regular 2D Case 2)
Frame type: progressive frame
Picture type: frame picture
MB type: frame MB adjacent to field MB
Mode: horizontal only Case 3)
Frame type: progressive frame
Picture type: frame picture
MB type: field MB adjacent to field MB
Mode: horizontal only Case 4)
Frame type: progressive frame
Picture type: field picture
MB type: any
Mode: horizontal only Case 5)
Frame type: interlaced frame
Picture type: frame picture
MB type: frame MB adjacent to frame MB
Mode: regular 2D (default); horizontal only (option)

Case 6)
Frame type: interlaced frame
Picture type: frame picture
MB type: frame MB adjacent to field MB
Mode: horizontal only Case 7)
Frame type: interlaced frame
Picture type: frame picture
MB type: field MB adjacent to field MB
Mode: horizontal only Case 8)
Frame type: interlaced frame
Picture type: field picture
MB type: any
Mode: regular 2D In an embodiment of the present invention adaptive deblocking filter 50 and de-ringing filter 60 can be separately enabled and disabled. When deblocking filter 50 and de-ringing filter 60 are both enabled, the de-ringing filter 60 should be applied on intermediate 10 bits result from de-blocking filter 50. If the input of de-ringing is 10 bits (0~1023), then the output can be normalized to 8 bits (0~255).

Figure 14:
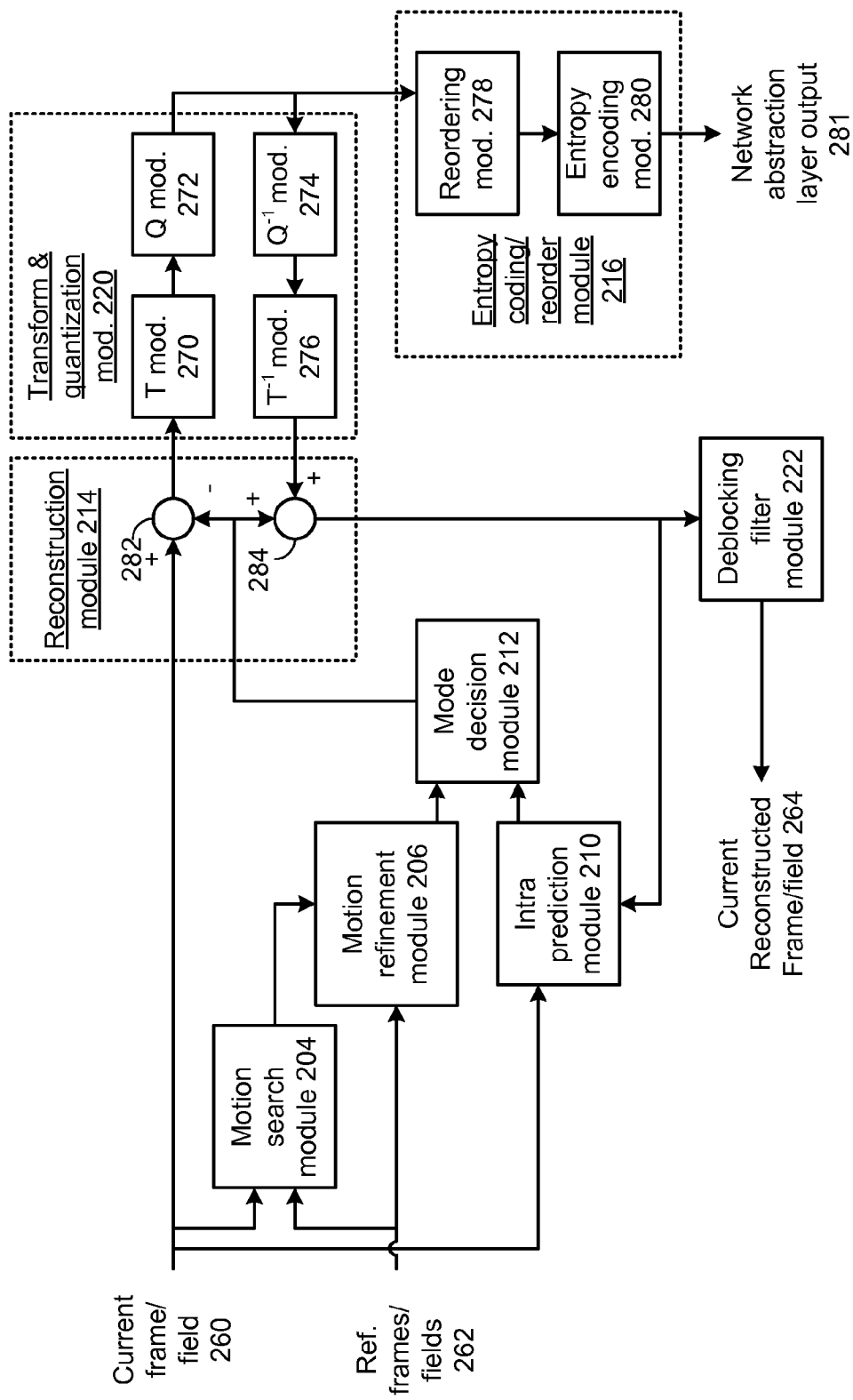
FIG. 14 presents a block flow diagram of a video encoding operation in accordance with an embodiment of the present invention.

FIG. 14 presents a block flow diagram of a video encoding operation in accordance with an embodiment of the present invention. While the prior description has focused on the use of video filter 102 in post processing, an example video encoding operation is shown includes an in-line deblocking filter module 222, such as video filter 102. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields and includes an optional de-ringing filter, such as de-ringing filter 60. It should also be noted that current reconstructed frames/fields 264 can be buffered to generate reference frames/fields 262 for future current frames/fields 260.

One or more of the modules of video encoder/decoder 102—including the deblocking filter module 222, can also be used in the decoding process as will be described further in conjunction with FIG. 15.

Figure 15:
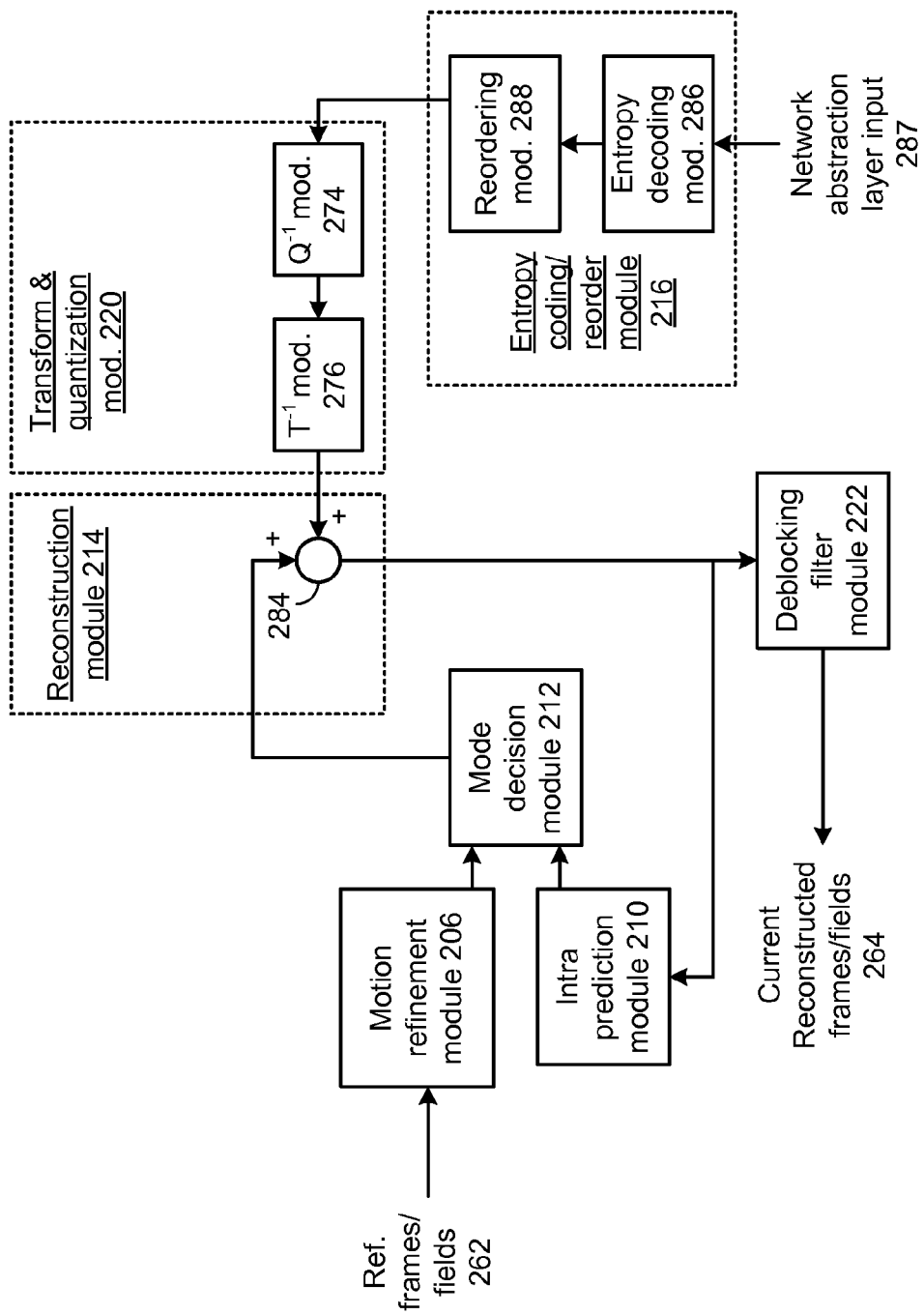
FIG. 15 presents a block flow diagram of a video decoding operation in accordance with an embodiment of the present invention.

FIG. 15 presents a block flow diagram of a video decoding operation in accordance with an embodiment of the present invention. In particular, this video decoding operation contains many common elements described in conjunction with FIG. 14 that are referred to by common reference numerals. In this case, the motion refinement module 206, the intra-prediction module 210, the mode decision module 212, and the deblocking filter module 222 are each used as described in conjunction with FIG. 14 to process reference frames/fields 262. In addition, the reconstruction module 214 reuses the adding circuit 284 and the transform and quantization module reuses the inverse transform module 276 and the inverse quantization module 274. In should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

Figure 16:
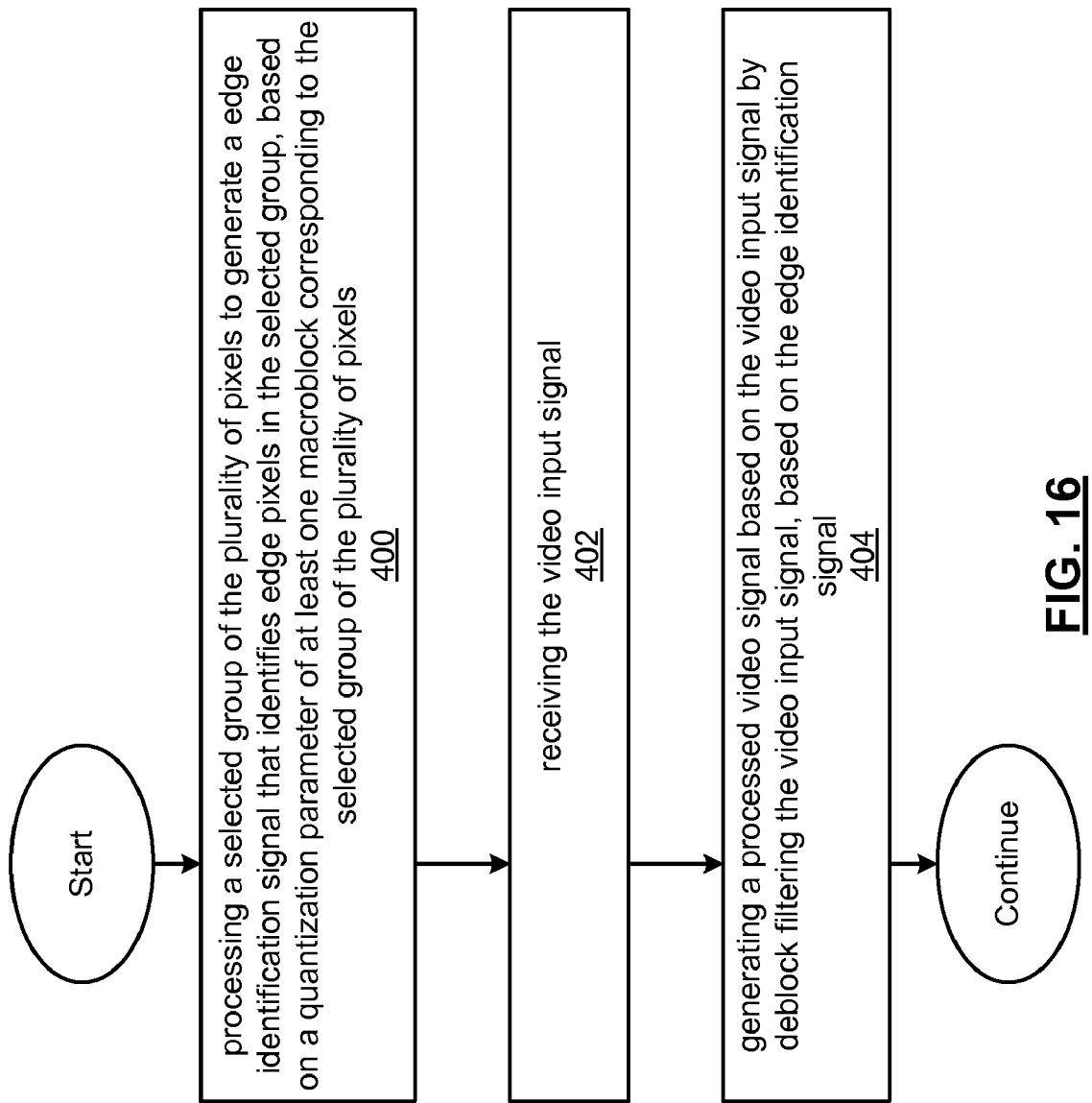
FIG. 16 presents a flowchart representation of a method in accordance with an embodiment of the present invention.

FIG. 16 presents a flowchart representation of a method in accordance with an embodiment of the present invention. In particular, a method is presented for use in conjunction with one or more functions and features presented in conjunction with FIGS. 1-15. In step 400, a selected group of the plurality of pixels is processed to generate a edge identification signal that identifies edge pixels in the selected group, based on a quantization parameter of at least one macroblock corresponding to the selected group of the plurality of pixels. In step 402, the video input signal is received. In step 404, a processed video signal is generated based on the video input signal by deblock filtering the video input signal, based on the edge identification signal.

In an embodiment of the present invention, step 400 includes generating a plurality of pixel differences based on the selected group of the plurality of pixels; generating a plurality of thresholds based on the quantization parameter; and identifying edge pixels based on a comparison of the plurality of pixel differences to the plurality of thresholds. Step 400 can include generating a detection signal that detects when a single macroblock encompasses the selected group of the plurality of pixels and when two macroblocks encompass the selected group of the plurality of pixels; and generating the quantization parameter of at least one macroblock corresponding to the selected group of the plurality of pixels by generating the quantization parameter proportional to a quantization parameter of the single macroblock, when the single macroblock that encompasses the selected group of the plurality of pixels; and generating the quantization parameter proportional to an average of two quantization parameters that correspond to the two macroblocks when the two macroblocks encompasses the selected group of the plurality of pixels.

The selected group of the plurality of pixels can include at least one vertical group and at least one horizontal group, and step 400 can include identifying horizontal edge pixels in the at least one horizontal group; and identifying vertical edge pixels in the at least one vertical group.

The method can further include generating a plurality of filter coefficients based on the edge identification signal, and step 404 can include filtering the video input signal based on the plurality of filter coefficients.

FIG. 17 presents a flowchart representation of a method in accordance with an embodiment of the present invention. In particular, a method is shown that includes common elements from FIG. 16 that are referred to by common reference numerals. In this embodiment, step 400 includes identifying horizontal edge pixels and identifying vertical edge pixels and step 406 is included for de-ring filtering the processed video signal, based on the edge identification signal.

Figure 18:
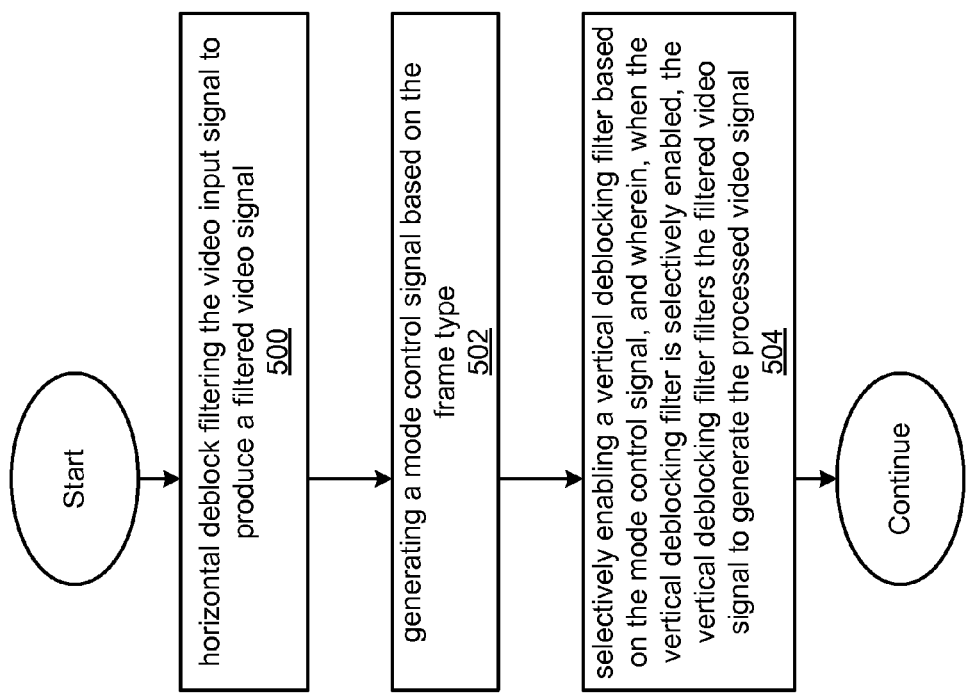
FIG. 18 presents a flowchart representation of a method in accordance with an embodiment of the present invention.

FIG. 18 presents a flowchart representation of a method in accordance with an embodiment of the present invention. In particular, a method is presented for use in conjunction with one or more functions and features presented in conjunction with FIGS. 1-17. In step 500, the video input signal is horizontal deblock filtered to produce a filtered video signal. In step 502, a mode control signal is generated based on the frame type. In step 504, a vertical deblocking filter is selectively enabled based on the mode control signal, and wherein, when the vertical deblocking filter is selectively enabled, the vertical deblocking filter filters the filtered video signal to generate the processed video signal.

In an embodiment of the present invention, the frame type includes one of: an interlaced frame type and a progressive frame type. The vertical deblocking filter can be selectively enabled when the mode control signal indicates the interlaced frame type. The video input signal can include a plurality of pictures, each having a picture type, and the mode control signal is further generated based on the picture type. The picture type can include one of: a frame picture type and a field picture type.

Figure 19:
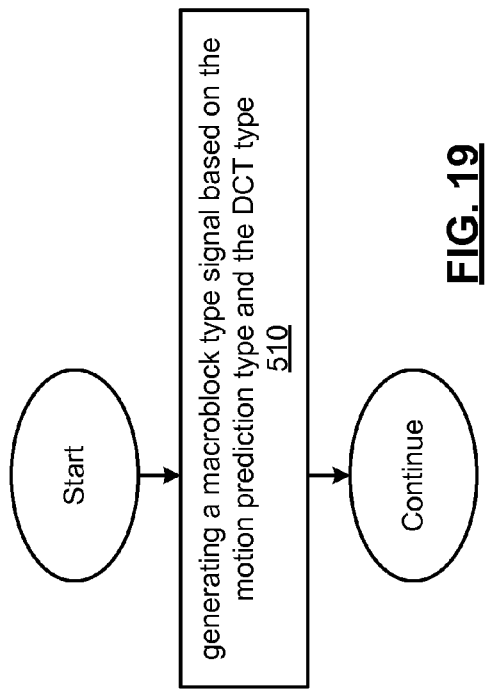
FIG. 19 presents a flowchart representation of a method in accordance with an embodiment of the present invention.

FIG. 19 presents a flowchart representation of a method in accordance with an embodiment of the present invention. In particular, a method is presented for use in conjunction with one or more functions and features presented in conjunction with FIGS. 1-18. Each of the plurality of pictures can include a plurality of macroblocks, each macroblock having a macroblock type, a motion prediction type and a discrete cosine transform (DCT) type. In step 510, a macroblock type signal is generated based on the motion prediction type and the DCT type, and the mode control signal can be further generated based on the macroblock type signal. The macroblock type can include: a frame macroblock adjacent to frame macroblock type; a field macroblock adjacent to field macroblock type; and/or a frame macroblock adjacent to field macroblock type.

Figure 20:
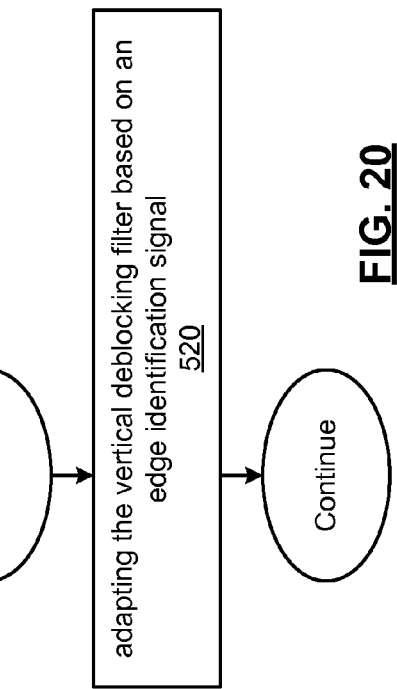
FIG. 20 presents a flowchart representation of a method in accordance with an embodiment of the present invention.

FIG. 20 presents a flowchart representation of a method in accordance with an embodiment of the present invention. In particular, a method is presented for use in conjunction with one or more functions and features presented in conjunction with FIGS. 1-19. In step 520, the vertical deblocking filter is adapted based on an edge identification signal.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video processing device, a video encoder/decoder and deblocking filter module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video filter that processes a video input signal that includes a plurality of pixels in a plurality of macroblocks, the video filter comprising:
   an edge detector that processes a selected group of at least six pixels of the plurality of pixels to generate an edge identification signal that identifies edge pixels in the selected group, wherein the edge detector is adapted based on a quantization parameter of at least one macroblock corresponding to the selected group of the plurality of pixels, wherein the edge detector generates the edge identification signal by:
   generating a plurality of pixel differences based on the selected group of the plurality of pixels that includes at least four pixel differences;
   generating a plurality of thresholds based on the quantization parameter that includes at least three thresholds; and
   identifying edge pixels based on a comparison of the plurality of pixel differences to the plurality of thresholds for each of the plurality of pixel differences; and
   an adaptive deblocking filter, coupled to receive the video input signal and to produce a processed video signal in response thereto, the adaptive deblocking filter being adaptive based on the edge identification signal.

2. The video filter of claim 1 wherein the edge detector further:
   generates a detection signal that detects when a single macroblock encompasses the selected group of the plurality of pixels and when two macroblocks encompass the selected group of the plurality of pixels;
   generates the quantization parameter of at least one macroblock corresponding to the selected group of the plurality of pixels by:
   generating the quantization parameter proportional to a quantization parameter of the single macroblock, when the single macroblock that encompasses the selected group of the plurality of pixels;
   generating the quantization parameter proportional to an average of two quantization parameters that correspond to the two macroblocks when the two macroblocks encompasses the selected group of the plurality of pixels.

3. The video filter of claim 1 wherein the selected group of the plurality of pixels includes at least one vertical group and at least one horizontal group, wherein the edge detector includes:
   a horizontal edge detector that identifies horizontal edge pixels in the at least one horizontal group; and
   a vertical edge detector that identifies vertical edge pixels in the at least one vertical group.

4. The video filter of claim 1 wherein the adaptive deblocking filter includes:
   a coefficient generator that generates a plurality of filter coefficients based on the edge identification signal;
   a filter, coupled to the coefficient generator, that filters the video input signal based on the plurality of filter coefficients.

5. The video filter of claim 4 wherein the coefficient generator processes a set of the plurality of pixels based on the edge identification signal for the set of the plurality pixels to generate a set pattern and that generates the plurality of filter coefficients by identifying the plurality of filter coefficients as corresponding to the set pattern.

6. The video filter of claim 5 wherein the set pattern is based on: an edge detected state, a no edge detected state and a do not care state for each pixel of the set.

7. The video filter of claim 4 wherein the coefficient generator generates a plurality of horizontal filter coefficients and a plurality of vertical filter coefficients based on the edge identification signal; and wherein the filter includes a horizontal filter that filters based on the plurality of horizontal filter coefficients and a vertical filter that filters based on the plurality of vertical filter coefficients.

8. The video filter of claim 1 further comprising:

a de-ringing filter, coupled to filter the processed video signal, based on the edge identification signal.

9. The video filter of claim 8 wherein the edge detector includes:

a horizontal edge detector that identifies horizontal edge pixels; and a vertical edge detector that identifies vertical edge pixels.

10. A method for use in a video processing device that processes a video input signal that includes a plurality of pixels in a plurality of macroblocks, the method comprising:

processing a selected group of at least six pixels of the plurality of pixels to generate an edge identification signal that identifies edge pixels in the selected group, based on a quantization parameter of at least one macroblock corresponding to the selected group of the plurality of pixels, wherein the edge identification signal is generated by:

generating plurality of pixel differences based on the selected group of the plurality of pixels that includes at least four pixel differences;

generating a plurality of thresholds based on the quantization parameter that includes at least three thresholds; and identifying edge pixels based on a comparison of the plurality of pixel differences to the plurality of thresholds for each of the plurality of pixel differences;

receiving the video input signal; and generating a processed video signal based on the video input signal by deblock filtering the video input signal, based on the edge identification signal.

11. The method of claim 10 wherein generating the edge identification signal is generated by:

generating a detection signal that detects when a single macroblock encompasses the selected group of the plurality of pixels and when two macroblocks encompass the selected group of the plurality of pixels; and generating the quantization parameter of at least one macroblock corresponding to the selected group of the plurality of pixels by:

generating the quantization parameter proportional to a quantization parameter of the single macroblock, when the single macroblock that encompasses the selected group of the plurality of pixels;

generating the quantization parameter proportional to an average of two quantization parameters that correspond to the two macroblocks when the two macroblocks encompasses the selected group of the plurality of pixels.

12. The method of claim 10 wherein the selected group of the plurality of pixels includes at least one vertical group and at least one horizontal group, wherein generating the edge identification signal includes:

identifying horizontal edge pixels in the at least one horizontal group; and identifying vertical edge pixels in the at least one vertical group.

13. The video filter of claim 10 further comprising:

generating a plurality of filter coefficients based on the edge identification signal;

wherein the deblock filtering filters the video input signal based on the plurality of filter coefficients.

14. The video filter of claim 10 wherein generating the edge identification signal includes:

identifying horizontal edge pixels; and identifying vertical edge pixels;

and wherein the method further comprises:

de-ring filtering the processed video signal, based on the edge identification signal.

\* \* \* \* \*